United States Patent
Brain et al.

(10) Patent No.: US 10,822,741 B2
(45) Date of Patent: Nov. 3, 2020

(54) SCENT BOOSTER COMPOSITIONS

(71) Applicant: INTERNATIONAL FLAVORS & FRAGRANCES INC., New York, NY (US)

(72) Inventors: Joseph Brain, Colts Neck, NJ (US); Jeffrey McElwee, Toms River, NJ (US); Jill De Jesus, Edison, NJ (US); Tamara Hopkins, Jersey City, NJ (US)

(73) Assignee: International Flavors & Frangrances Inc., New York, NY (US)

( * ) Notice: Subject to any disclaimer, the term of this patent is extended or adjusted under 35 U.S.C. 154(b) by 443 days.

(21) Appl. No.: 15/428,341

(22) Filed: Feb. 9, 2017

(65) Prior Publication Data
US 2017/0226690 A1  Aug. 10, 2017

Related U.S. Application Data

(60) Provisional application No. 62/293,153, filed on Feb. 9, 2016.

(51) Int. Cl.
| | | |
|---|---|---|
| *D06M 13/00* | (2006.01) | |
| *B01J 13/06* | (2006.01) | |
| *C11D 3/50* | (2006.01) | |

(52) U.S. Cl.
CPC ........... *D06M 13/005* (2013.01); *B01J 13/06* (2013.01); *C11D 3/50* (2013.01)

(58) Field of Classification Search
CPC ................................. B01J 14/06; D06M 13/00
See application file for complete search history.

(56) References Cited

U.S. PATENT DOCUMENTS

| | | | | |
|---|---|---|---|---|
| 7,867,968 B1* | 1/2011 | Aouad | ...................... | C08K 7/22 510/296 |
| 7,871,976 B1* | 1/2011 | Aouad | ...................... | C08K 7/22 512/2 |
| 8,333,289 B2* | 12/2012 | Lopez | ..................... | B65D 25/36 215/228 |
| 2005/0175577 A1* | 8/2005 | Jenkins | ................... | A61L 9/014 424/76.1 |
| 2006/0102656 A1* | 5/2006 | Troost | ..................... | A61K 8/11 222/132 |
| 2006/0172917 A1* | 8/2006 | Vedantam | .............. | C11D 3/046 512/12 |
| 2008/0299054 A1* | 12/2008 | Chandar | ................ | A61K 8/416 424/54 |
| 2009/0253612 A1* | 10/2009 | Mushock | .................. | A23L 2/39 512/4 |
| 2012/0137448 A1* | 6/2012 | Panandiker | .............. | C11D 1/62 8/137 |
| 2013/0095717 A1* | 4/2013 | VanBlarcom | ........ | B65D 85/808 442/96 |
| 2013/0184194 A1* | 7/2013 | Chen | .................. | C11D 17/0039 510/321 |
| 2014/0206587 A1* | 7/2014 | Chen | ....................... | A61K 8/66 510/119 |
| 2015/0099680 A1* | 4/2015 | Smets | .................... | A61Q 13/00 510/106 |
| 2016/0177222 A1* | 6/2016 | Bianchetti | ................ | A61K 8/35 424/65 |
| 2016/0362645 A1* | 12/2016 | Brown | ................. | C11D 3/3707 |
| 2016/0376522 A1* | 12/2016 | Bianchetti | ........... | C11D 11/0017 424/65 |
| 2017/0226690 A1* | 8/2017 | Brain | .................. | D06M 13/005 |

FOREIGN PATENT DOCUMENTS

| | | | |
|---|---|---|---|
| CN | 106176310 A | * | 12/2016 |
| CN | 106466256 A | * | 3/2017 |
| WO | 2016078941 A1 | | 5/2016 |
| WO | 2016078942 A1 | | 5/2016 |

* cited by examiner

*Primary Examiner* — Mark Eashoo
*Assistant Examiner* — M. Reza Asdjodi
(74) *Attorney, Agent, or Firm* — Martin Zhang; Xufan Tseng; Elizabeth M. Stover

(57) ABSTRACT

A scent booster composition having a pastille formulation and optionally a sodium chloride system. The pastille formulation contains by weight of the formulation (i) 1 to 30% of a fragrance microcapsule that has a microcapsule core and a microcapsule wall encapsulating the microcapsule core, in which the microcapsule core contains a fragrance, (ii) 0 to 40% of a free fragrance, (iii) 0 to 25% of a clay, and (iv) 50 to 70% of polyethylene glycol that has a molecular weight of 2,000 to 10,000. Also disclosed is a method of using the scent booster composition.

19 Claims, No Drawings

SCENT BOOSTER COMPOSITIONS

BACKGROUND

More and more consumers prefer a strong and long-lasting scent on their laundry even weeks after washing. In a laundry application, it is desirable to enhance the consumer experience by releasing scent at different consumer contact points such as point of purchase, opening the door of a dryer, storing clothing, and wearing clothing. Current laundry detergents and fabric softeners cannot provide long-lasting, strong to intermediate scent at the stage of storing and wearing clothing due to their fragrance load limitation, and loss of fragrance during washing and drying.

Scent boosters have been used in laundry to increase the scent level. See U.S. Pat. Nos. 7,867,968, 7,871,976, and 8,333,289. In some formulations, both free and encapsulated fragrances are included in a polymeric pastille. See U.S. Pat. No. 7,867,968. To achieve a desired scent level, the free fragrance is formulated at a high level (e.g., 5.9% by weight of the pastille).

There is a need to develop a cost-efficient scent booster formulation with a high performance.

SUMMARY OF THE INVENTION

This application is based on the unexpected discovery of a long-lasting, high performing scent booster composition suitable for laundry use.

Accordingly, one aspect of this invention relates to a scent booster composition comprising a pastille formulation containing by weight of the formulation (i) 0 to 30% (e.g., 1 to 30%, 1 to 20%, 2 to 15%, and 3 to 10%) a fragrance microcapsule that has a microcapsule core and a microcapsule wall encapsulating the microcapsule core, in which the microcapsule core contains a fragrance, (ii) 0 to 40% (e.g., 0 to 30% and 3 to 20%) a free fragrance, (iii) 0 to 25% (e.g., 2 to 20%, 5 to 20%, and 5 to 15%) a clay, and (iv) 50 to 70% polyethylene glycol that has a molecular weight of 2,000 to 10,000 (e.g., 3,000 to 9,000). The pastille formulation can further contain 0.1 to 40% a filler. Examples of the filler include silica, sodium carbonate, sodium bicarbonate, soluble starch, pre-gelatinized starch, magnesium aluminum silicate, bentonite, microcrystalline cellulose, sodium carboxy methylcellulose, polyvinylpyrrolidone, guar gum, isapgul, sodium starch glycolate, aerosol, natural spon citrus pulp, alginic acid, alginates, ion exchange resin, modified corn starch, sodium dodecyl sulphate, sodium starch glycollateor, and combinations thereof.

The scent booster composition of this invention can further comprise a sodium chloride system containing by weight of the system (i) 1 to 30% (e.g., 2 to 20% and 2 to 10%) a free fragrance and (ii) 70 to 99% (e.g., 90 to 98% and 90 to 98%) sodium chloride, wherein the weight ratio of the sodium chloride system and the pastille formulation is 50:50 to 95:5 (e.g., 50:50 to 90:10, 70:30 to 90:10, and 80:20 to 90:10).

Optionally, the sodium chloride system further contains by weight of the system the following: (i) 0.1 to 5% fumed silica, and/or (ii) 0.1 to 5% sodium silicate.

Also within the scope of this invention is a method of treating laundry. The method includes the step of adding the scent booster composition described above to a laundry washing machine or wash basin.

DETAILED DESCRIPTION OF THE INVENTION

It has been found that certain scent booster compositions unexpectedly provide a long-lasting, enhanced scent level in consumer applications such as laundry and dish washing.

In one embodiment, the scent booster compositions of this invention each comprise a pastille formulation that contains a microcapsule and a water-dispersible or water-soluble solid matrix (e.g., polyethylene glycol). Optionally, the pastille formulation includes a clay, a filler, and/or a free fragrance.

In addition to the pastille formulation, the scent booster composition can further comprise a salt system that contains a free fragrance and a water-soluble salt. Optionally, the salt system includes a filler such as fumed silica and/or sodium silicate.

The pastille formulation can be used alone or in combination with the salt system. Similarly, the salt system can be used alone or in combination in the scent booster. Preferably, the scent booster composition contains both the salt system and the pastille formulation.

The scent booster compositions typically are in a solid form as tablets, beads, balls, capsules, pouches, dryer sheets, films, or powder. They can also be in a liquid or semi-solid form as solutions, dispersions, paste, and emulsions.

Each material useful in preparing the scent booster composition is described in detail below.

Water-Soluble Salt

Any organic or inorganic water-soluble salt can be used in the salt system of the scent booster. A water-soluble salt has a solubility in water equal to or greater than 0.1 moles/liter at 20° C.

Examples of an inorganic water-soluble salt include salts of an alkali metal ($Li^+$, $Na^+$, $K^+$, $Cs^+$, and $Rb^+$), salts of ammonium ($NH_4^+$), salts of silicates (e.g., sodium silicate), halide salts (e.g., sodium chloride, potassium chloride, potassium iodide, lithium chloride, and calcium chloride), nitrate salts (e.g., sodium nitrate), sulfate salts (e.g., $BaSO_4$, $PbSO_4$, $Ag_2SO_4$, and $SrSO_4$), carbonates (e.g., sodium carbonate and potassium bicarbonate), and phosphate salts (e.g., sodium phosphate, potassium hydrogen phosphate, and ammonium biphosphate).

Examples of an organic water-soluble salt include acetate salts (e.g., sodium acetate), citrate salts (e.g., monosodium citrate).

Free Fragrances

A free fragrance refers to a neat fragrance essentially free of a fragrance carrier. It is not encapsulated or enclosed within a polymeric network, or otherwise immobilized in a delivery system.

Suitable fragrances are described in International Application Publication WO2015/023961A1 and US Application Publication US2014/0287008A1.

The free fragrance can be present in the salt system, the pastille formulation, or both. The salt system typically contains the free fragrance at a level of 0 to 50% (e.g., 0.1 to 30%, 0.2 to 20%, and 0.3 to 10%) by weight of the salt system. The pastille formulation can contain the free fragrance at a level of 0 to 50% (e.g., 0 to 30%, 0.1 to 30%, 0.2 to 20%, 0.3 to 15%, 0.3 to 3%, 0.3 to 2%, and 0.1 to 10%) by weight of the pastille formulation. In combination, the scent booster composition has a free fragrance in the range of 0 to 50% (e.g., 0.1 to 2%, 0.1 to 30%, 0.1 to 50%, 0.2 to 2%, 0.2 to 20%, 0.3 to 3%, 0.3 to 5%, and 0.5 to 10%) by weight of the scent booster composition.

It is unexpectedly found that the free fragrance in the salt system has a much stronger fragrance intensity than that in the pastille formulation at the same free fragrance level during the performance test at point of purchase. As a result, less free fragrance is needed in the scent booster composition to achieve a desired fragrance intensity when the scent booster composition contains both the salt system and the pastille formulation.

Clay

The scent booster composition optionally contains 5 to 40% (e.g., 5 to 20% and 10 to 15%) clay by weight of the scent booster composition, either in the salt system or pastille formulation. Preferably, clay is contained in the pastille formulation at a level of 1 to 40% (e.g., 3 to 30% and 5 to 20%) by weight of the pastille formulation. Clay improves the fragrance performance by increasing the dissociation of the formulation and thus efficiently releasing the fragrance from the formulation to the environment when used in a consumer application.

Exemplary clays are the absorbent aluminum phyllosilicate clay (including montmorillonite) such as Bentolite H, Bentonite, Halloysite, Kaolinite, and Illite, and magnesium silicate such as Talc.

Water-Compatible Matrix and Filler

The pastille formulation contains a solid water-compatible matrix at a level of 30 to 99% (e.g., 50 to 99%, 70 to 99%, 50 to 85%, and 80 to 99%) by weight of the pastille formulation. The water-compatible matrix is capable of being dispersed or dissolved in water without requiring a surfactant or other dissolving aids.

In some embodiments, the water-compatible matrix is a water-dispersible or water-dissolvable polymer. The term "water-dispersible polymer" as used herein refers to a polymer that is itself capable of being dispersed in water to form a stable dispersion without requiring the use of a surfactant. The term "water-soluble polymer" refers to a polymer that is capable of being dissolved in water to form a solution without requiring the use of a surfactant. A water-soluble polymer completely dissolves in water. A water-dispersible polymer breaks down into minute particles.

Examples are polyethylene glycol, propylene glycols, polypropylene glycols, water degradable grades of polyvinyl alcohol, polyvinylpyrrolidone, water degradable acrylic acid based copolymers, polylactic acid, polysaccharides and derivatives (e.g., methyl cellulose, hydroxypropyl cellulose, methylated hydroxypropyl cellulose, hydroxyethyl cellulose, and starch), vinyl pyrrolidone/vinyl ester copolymers. Other suitable polymers include copolymers of polyethylene oxide and polypropylene oxide, other water dispersible ethylene oxide copolymers, water dispersible blends of polyethylene oxide, blends of polyvinyl alcohol, polyethyloxazoline, water degradable branched polyesters and copolyesters, water dispersible polyurethanes, water dispersible polyvinyl methyl ether, water degradable vinyl polymers, water degradable copolymers of lactic acid and a modifying monomer selected from the group consisting of ethylene glycols, P-dioxanone, 1,5-dioxepan-2-one, 1,4-oxathialan-2-one, 1,4-dioxide, the mixtures thereof, and the like. See U.S. Pat. No. 6,117,438, U.S. Pat. No. 8,772,205, and U.S. Pat. No. 5,360,892. Still other suitable polymers are those described in WO2000/066701A1.

In other embodiments, the water-compatible matrix is a carbohydrate, a hydrogenated carbohydrate, a hydrolyzed carbohydrate, a polyol, a polyether, or a combination thereof. Preferably, it is xylitol, mannitol, ribose, mannose, xylose, galactose, fructose, lactose, glucose, isomaltose, isomalt, sucrose, maltitol, trehalose, arabinose, sorbitol, polyisomaltose, isomalto-oligosaccharide, dextrin, dextran, fructooligosaccharide, or a combination thereof Preferably, the pastille formulation contains polyethylene glycol ("PEG") as the water-compatible matrix. Suitable polyethylene glycol has a molecular weight of 300 to 10,000,000 (e.g., 500 to 1,000,000, 800 to 500,000, 1000 to 200,000, 1500 to 50000, 2000 to 10000, 3000 to 9000, and 3450 to 8000). The polyethylene glycol is present in an amount of 40 to 90% (preferably 50 to 70%) by weight of the pastille formulation.

The scent booster composition can also contain a filler, either in the salt system or pastille formulation. Examples of the filler include silica, sodium carbonate, sodium bicarbonate, soluble starch, pre-gelatinized starch, magnesium aluminum silicate, bentonite, microcrystalline cellulose, sodium carboxy methylcellulose, polyvinylpyrrolidone, guar gum, isapgul, sodium starch glycolate, aerosol, natural spon citrus pulp, alginic acid, alginates, ion exchange resin, modified corn starch, sodium dodecyl sulphate, sodium starch glycollateor, and combinations thereof.

Microcapsules

The pastille formulation contains microcapsules having a core and a microcapsule wall encapsulating the core. The core has an active material such as a fragrance, flavor, or malodor counteractant. The wall is formed of a polymer such as a urea-formaldehyde polymer, a melamine-formaldehyde polymer, a phenolic-formaldehyde polymer, a urea-glutaraldehyde polymer, a melamine-glutaraldehyde polymer, a phenolic-glutaraldehyde polymer, polyurea, polyurethane, polyacrylate, polyamide, polyester, an epoxy cross-linked polymer, a polyfunctional carbodiimide cross-linked polymer, silica, a silica-derived material, polysiloxanes, polyimide, polyvinyl alcohol, polyanhydride, polyolefin, polysulfone, polysaccharide, protein, polylactide (PLA), polyglycolide (PGA), polyorthoester, polyphosphazene, silicone, lipid, modified cellulose, gums, polystyrene, and combinations of these materials. Other suitable polymeric materials are ethylene maleic anhydride copolymer, styrene maleic anhydride copolymer, ethylene vinyl acetate copolymer, and lactide glycolide copolymer. Biopolymers that are derived from alginate, chitosan, collagen, dextran, gelatin, and starch can also be used as the encapsulating materials. Additionally, microcapsules can be made via the simple or complex coacervation of gelatin. Preferred encapsulating wall polymers include those formed from isocyanates, acrylates, acrylamide, acrylate-co-acrylamide, hydrogel monomers, sol-gel precursors, gelatin, melamine-formaldehyde or urea-formaldehyde condensates, as well as similar types of aminoplasts.

Preparation of microcapsules is described in e WO 2004/054362; EP 0 148149; EP 0 017 409 B1; U.S. Pat. Nos. 4,417,916, 4,124,526, 4,285,720, 4,681,806, 5,583,090, 6,340,653 6,566,306, 6,730,635, 8,299,011, WO 90/08468, WO 92/13450, U.S. Pat. No. 3,516,941, Deposition Aids The scent booster composition can include a deposition aid from 0.001 to 5%, more preferably from 0.1 to 2% by weight of the composition. The deposition aid is used to aid in deposition of microcapsules to surfaces such as fabric, hair or skin. Examples of the deposition aid include anionically, cationically, nonionically, or amphoteric water-soluble polymers. Those skilled in the art would appreciate that the charge of these polymers can be adjusted by changing the pH, depending on the product in which this technology is to be used. Any suitable method for coating the deposition aids onto the encapsulated fragrance materials can be used.

Particular examples of cationic polymers useful as deposition aids include, e.g., polysaccharides such as guar, alginates, starch, xanthan, chitosan, cellulose, dextrans, arabic gum, carrageenan, and hyaluronates. These polysaccharides can be employed with cationic modification and alkoxy-cationic modifications such as cationic hydroxyethyl or cationic hydroxypropyl. For example, cationic reagents of choice are 3-chloro-2-hydroxypropyl trimethylammonium chloride or its epoxy version. Another example is graft-copolymers of polyDADMAC on cellulose. Alternatively, polysaccharides can be employed with aldehyde, carboxyl, succinate, acetate, alkyl, amide, sulfonate, ethoxy, propoxy, butoxy, and combinations of these functionalities; or any hydrophobic modification (compared to the polarity of the polysaccharide backbone). The above modifications can be in any ratio and the degree of functionalization can be up to complete substitution of all functionalizable groups, as long as the theoretical net charge of the polymer is zero (mixture of cationic and anionic functional groups) or preferably positive. Furthermore, up to 5 different types of functional groups may be attached to the polysaccharides. Also, polymer graft chains may be differently modified to the backbone. The counterions can be any halide ion or organic counter ion. See U.S. Pat. Nos. 6,297,203 and 6,200,554.

Another source of cationic polymers contain protonatable amine groups so that the overall net charge is zero (amphoteric: mixture of cationic and anionic functional groups) or positive. The pH during use will determine the overall net charge of the polymer. Examples include silk protein, zein, gelatin, keratin, collagen and any polypeptide, such as polylysine.

Further cationic polymers include polyvinyl polymers with up to 5 different types of monomers can be used.

Another class of materials are polyacrylates with up to 5 different types of monomers. Typical polymers of choice are those containing the cationic monomer dimethylaminoethyl methacrylate (DMAEMA) or methacrylamidopropyl trimethyl ammonium chloride (MAPTAC). DMAEMA can be found in GAFQUAT and GAFFIX VC-713 polymers from ISP. MAPTAC can be found in BASF's LUVIQUAT PQ11 PN and ISP's GAFQUAT HS100.

Another group of polymers that can be used are those that contain cationic groups in the main chain or backbone. Included in this group are:

i) polyalkylene imines such as polyethylene imine, commercially available as LUPASOL from BASF. Any molecular weight and any degree of crosslinking of this polymer can be used in the present invention;

ii) ionenes as disclosed in U.S. Pat. No. 4,395,541 and U.S. Pat. No. 4,597,962;

iii) adipic acid/dimethyl amino hydroxypropyl diethylene triamine copolymers, such as CARTARETIN F-4 and F-23, commercially available from Sandoz;

iv) polymers of the general formula: —[N(CH$_3$)$_2$—(CH$_2$)$_x$—NH—(CO)—NH—(CH$_2$)$_y$—N(CH$_3$)$_2$—(CH$_2$)$_z$—O—(—CH$_2$)$_p$]$_n$—, with x, y, z, p=1-12, and n according to the molecular weight requirements. Examples are Polyquaternium-2 (MIRAPOL A-15), Polyquater-nium-17 (MIRAPOL AD-1), and Polyquaternium-18 (MIRAPOL AZ-1). Other polymers include cationic polysiloxanes and cationic polysiloxanes with carbon-based grafts with a net theoretical positive charge or equal to zero (mixture of cationic and anionic functional groups). This includes cationic end-group functionalized silicones (i.e., Polyquaternium-80). Silicones with general structure: —Si(R$_1$)(R$_2$)—O—]$_x$—[Si(R$_3$)(R$_2$)—O—]$_y$— where R$_1$ is any alkane from C$_1$-C$_{25}$ or H with number of double bonds from 0-5, aromatic moieties, polysiloxane grafts, or mixtures thereof. R$_1$ can also be a liquid crystalline moiety that can provide the polymer with thermotropic liquid crystalline properties. R$_2$ can be H or CH$_3$; and R$_3$ can be —R$_1$—R$_4$, where R$_4$ can be —NH$_2$, —NHR$_1$, —NR$_1$R$_2$, —NR$_1$R$_2$R$_6$ (where R$_6$=R$_1$, R$_2$, or —CH$_2$—COOH or its salt), —NH—C(O)—, —COOH, —COO— alkali salt, any C$_1$-C$_{25}$ alcohol, —C(O)—NH$_2$ (amide), —C(O)—N(R$_2$)(R$_2$')(R$_2$"), sulfobetaine, betaine, polyethylene oxide, poly(ethyleneoxide/propylene oxide/butylene oxide) grafts with any end group, H, —OH, styrene sulfonate, pyridine, quaternized pyridine, alkyl-substituted pyrrolidone or pyridine, pyridine-N-oxide, imidazolinium halide, imidazolium halide, imidazol, piperidine, pyrrolidone, caprolactam, sulfonate, ethoxysulphate phenyl-R$_5$ or naphthalene-R$_6$ where R$_5$ and R$_6$ are R$_1$, R$_2$, R$_3$, sulfonic acid or its alkali salt or organic counter ion. R$_3$ can also be —(CH$_2$)$_x$—O—CH$_2$—CH(OH)—CH$_2$—N(CH$_3$)$_2$—CH$_2$—COOH and its salts. Any mixture of these R$_3$ groups can be selected. X and y can be varied as long as the theoretical net charge of the polymer is zero (amphoteric) or positive. In addition, polysiloxanes containing up to 5 different types of monomeric units may be used. Examples of suitable polysiloxanes are found in U.S. Pat. Nos. 4,395,541 4,597,962 and 6,200,554. Another group of polymers that can be used to improve capsule/particle deposition are phospholipids that are modified with cationic polysiloxanes. Examples of these polymers are found in U.S. Pat. No. 5,849,313, WO Patent Application 95/18096A1 and European Patent No. 0737183B1.

Furthermore, copolymers of silicones and polysaccharides and proteins can be used (e.g., those commercially available as CRODASONE brand products).

Another class of polymers includes polyethylene oxide-co-propyleneoxide-co-butylene oxide polymers of any ethylene oxide/propylene oxide/butylene oxide ratio with cationic groups resulting in a net theoretical positive charge or equal to zero (amphoteric). Examples of such polymers are the commercially available TETRONIC brand polymers.

Suitable polyheterocyclic (the different molecules appearing in the backbone) polymers include the piperazine-alkylene main chain copolymers disclosed by Kashiki and Suzuki (1986) *Ind. Eng. Chem. Fundam.* 25:120-125.

The scent booster compositions of this invention are suitable for use in many applications as listed below.

Applications. The scent booster compositions of the present invention are well-suited for use, without limitation, in the following applications:

a) Laundry. The scent booster compositions can be added to a laundry washing machine or wash basin, with or without a liquid or powder detergent. They can be added before a laundry cycle, during soaking, washing, or rinsing, or before removing the laundry for drying.

b) The scent booster compositions can also be added to a dryer, with or without fabric conditioners, tumble drier sheets, fabric refreshers, fabric refresher sprays, and fabric softener systems such as those described in U.S. Pat. Nos. 6,335,315.

c) The scent booster compositions can be added to an automatic dish washer or a hand dish washing basin, with or without a liquid/solid dish detergents including Automatic Dish Detergents such as those described in U.S. Pat. Nos. 6,020,294, 6,017,871, 5,968,881, 5,962,386, 5,939,373, 5,914,307, 5,902,781, 5,705,464, 5,703,034, 5,703,030, 5,679,630, 5,597,936, 5,581,005, 5,559,261, 4,515,705, 5,169,552, and 4,714,562

The scent booster compositions can also be added to the following products:

d) All-purpose Cleaners including bucket dilutable cleaners and toilet cleaners e) Bathroom Cleaners f) Bath Tissue g) Rug Deodorizers i. Candles ii. Room Deodorizers iii. Floor Cleaners iv. Disinfectants v. Window Cleaners vi. Garbage bags/trash can liners vii. Air Fresheners including room deodorizer and car deodorizer, scented candles, sprays, scented oil air freshener, Automatic spray air freshener, and neutralizing gel beads viii. Moisture absorber ix. Household Devices such as paper towels and disposable Wipes x. Moth balls/traps/cakes h) Baby Care Products i. Diaper Rash Cream/Balm ii. Baby Powder i) Baby Care Devices i. Diapers ii. Bibs iii. Wipes j) Oral Care Products. Tooth care products (as an example of preparations according to the invention used for oral care) generally include an abrasive system (abrasive or polishing agent), for example silicic acids, calcium carbonates, calcium phosphates, aluminum oxides and/or hydroxylapatites, surface-active substances, for example sodium lauryl sulfate, sodium lauryl sarcosinate and/or cocamidopropylbetaine, humectants, for example glycerol and/or sorbitol, thickening agents, for example carboxymethyl cellulose, polyethylene glycols, carrageenan and/or Laponite®, sweeteners, for example saccharin, taste correctors for unpleasant taste sensations, taste correctors for further, normally not unpleasant taste sensations, taste-modulating substances (for example inositol phosphate, nucleotides such as guanosine monophosphate, adenosine monophosphate or other substances such as sodium glutamate or 2-phenoxypropionic acid), cooling active ingredients, for example menthol derivatives, (for example L-menthyllactate, L-menthylalkylcarbonates, menthone ketals, menthane carboxylic acid amides), 2,2,2-trialkylacetic acid amides (for example 2,2-diisopropylpropionic acid methyl amide), icilin and icilin derivatives, stabilizers and active ingredients, for example sodium fluoride, sodium monofluorophosphate, tin difluoride, quaternary ammonium fluorides, zinc citrate, zinc sulfate, tin pyrophosphate, tin dichloride, mixtures of various pyrophosphates, triclosan, cetylpyridinium chloride, aluminum lactate, potassium citrate, potassium nitrate, potassium chloride, strontium chloride, hydrogen peroxide, flavorings and/or sodium bicarbonate or taste correctors.

i. Tooth Paste. An exemplary formulation as follows:

1. calcium phosphate 40-55%

2. carboxymethyl cellulose 0.8-1.2%

3. sodium lauryl sulfate 1.5-2.5%

4. glycerol 20-30%

5. saccharin 0.1-0.3%

6. flavor oil 1-2.5%

7. water q.s. to 100%

A typical procedure for preparing the formulation includes the steps of (i) mixing by a blender according to the foregoing formulation to provide a toothpaste, and (ii) adding a composition of this invention and blending the resultant mixture till homogeneous.

ii. Tooth Powder iii. Oral Rinse iv. Tooth Whiteners v. Denture Adhesive k) Health Care Devices i. Dental Floss ii. Toothbrushes iii. Respirators iv. Scented/flavored condoms l) Feminine Hygiene Products such as Tampons, Feminine Napkins and Wipes, and Pantiliners m) Personal Care Products: Cosmetic or pharmaceutical preparations, e.g., a "water-in-oil" (W/O) type emulsion, an "oil-in-water" (O/W) type emulsion or as multiple emulsions, for example of the water-in-oil-in-water (W/O/W) type, as a PIT emulsion, a Pickering emulsion, a microemulsion or nano-emulsion; and emulsions which are particularly preferred are of the "oil-in-water" (O/W) type or water-in-oil-in-water (W/O/W) type. More specifically, i. Personal Cleansers (bar soaps, body washes, and shower gels)

ii. In-shower conditioner iii. Sunscreen ant tattoo color protection (sprays, lotions, and sticks)

iv. Insect repellants v. Hand Sanitizer vi. Antiinflammatory balms, ointments, and sprays vii. Antibacterial ointments and creams viii. Sensates ix. Deodorants and Antiperspirants including aerosol and pump spray antiperspirant, stick antiperspirant, roll-on antiperspirant, emulsion spray antiperspirant, clear emulsion stick antiperspirant, soft solid antiperspirant, emulsion roll-on antiperspirant, clear emulsion stick antiperspirant, opaque emulsion stick antiperspirant, clear gel antiperspirant, clear stick deodorant, gel deodorant, spray deodorant, roll-on, and cream deodorant.

x. Wax-based Deodorant. An exemplary formulation as follows:

1. Parafin Wax 10-20%

2. Hydrocarbon Wax 5-10%

3. White Petrolatum 10-15%

4. Acetylated Lanolin Alcohol 2-4%

5. Diisopropyl Adipate 4-8%

6. Mineral Oil 40-60%

7. Preservative (as needed)

The formulation is prepared by (i) mixing the above ingredients, (ii) heating the resultant composition to 75° C. until melted, (iii) with stirring, adding 4% cryogenically ground polymer containing a fragrance while maintaining the temperature 75° C., and (iv) stirring the resulting mixture in order to ensure a uniform suspension while a composition of this invention is added to the formulation.

xi. Glycol/Soap Type Deodorant. An exemplary formulation as follows:
1. Propylene Glycol 60-70%
2. Sodium Stearate 5-10%
3. Distilled Water 20-30%
4. 2,4,4-Trichloro-2'-Hydroxy Diphenyl Ether, manufactured by the Ciba-Geigy Chemical Company and a Trademark of the Ciba-Geigy Chemical Company) 0.01-0.5%
    The ingredients are combined and heated to 75° C. with stirring until the sodium stearate has dissolved. The resulting mixture is cooled to 40° C. followed by addition of a composition of this invention.
xii. Lotion including body lotion, facial lotion, and hand lotion
xiii. Body powder and foot powder
xiv. Toiletries
xv. Body Spray
xvi. Shave cream and male grooming products
xvii. Bath Soak
xviii. Exfoliating Scrub
n) Personal Care Devices
i. Facial Tissues
ii. Cleansing wipes
o) Hair Care Products
i. Shampoos (liquid and dry powder)
ii. Hair Conditioners (Rinse-out conditioners, leave-in conditioners, and cleansing conditioners)
iii. Hair Rinses
iv. Hair Refreshers
v. Hair perfumes
vi. Hair straightening products
vii. Hair styling products, Hair Fixative and styling aids
viii. Hair combing creams
ix. Hair wax
x. Hair foam, hair gel, nonaerosol pump spray
xi. Hair Bleaches, Dyes and Colorants
xii. Perming agents
xiii. Hair wipes
p) Beauty Care
i. Fine Fragrance—Alcoholic. Compositions and methods for incorporating fragrance capsules into alcoholic fine fragrances are described in U.S. Pat. No. 4,428,869. Alcoholic fine fragrances may contain the following:
1. Ethanol (1-99%)
2. Water (0-99%)
3. A suspending aide including but not limited to: hydroxypropyl cellulose, ethyl cellulose, silica, microcrystalline cellulose, carrageenan, propylene glycol alginate, methyl cellulose, sodium carboxymethyl cellulose or xanthan gum (0-1%)
4. Optionally an emulsifier or an emollient may be included including but not limited to those listed above
ii. Solid Perfume
iii. Lipstick/lip balm
iv. Make-up cleanser
v. Skin care cosmetic such as foundation, pack, sunscreen, skin lotion, milky lotion, skin cream, emollients, skin whitening
vi. Make-up cosmetic including manicure, mascara, eyeliner, eye shadow, liquid foundation, powder foundation, lipstick and cheek rouge q) Consumer goods packaging such as fragranced cartons, fragranced plastic bottles/boxes
r) Pet care products
i. Cat litter
ii. Flea and tick treatment products
iii. Pet grooming products
iv. Pet shampoos
v. Pet toys, treats, and chewables
vi. Pet training pads
vii. Pet carriers and crates
s) Confectionaries confectionery, preferably selected from the group consisting of chocolate, chocolate bar products, other products in bar form, fruit gums, hard and soft caramels and chewing gum
i. Gum
    1. Gum base (natural latex chicle gum, most current chewing gum bases also presently include elastomers, such as polyvinylacetate (PVA), polyethylene, (low or medium molecular weight) polyisobutene (PIB), polybutadiene, isobutene-isoprene copolymers (butyl rubber), polyvinylethylether (PVE), polyvinylbutyether, copolymers of vinyl esters and vinyl ethers, styrene-butadiene copolymers (styrene-butadiene rubber, SBR), or vinyl elastomers, for example based on vinylacetate/vinyllaurate, vinylacetate/vinylstearate or ethylene/vinylacetate, as well as mixtures of the mentioned elastomers, as described for example in EP 0 242 325, U.S. Pat. No. 4,518,615, U.S. Pat. No. 5,093,136, U.S. Pat. No. 5,266,336, U.S. Pat. No. 5,601,858 or U.S. Pat. No. 6,986,709.) 20-25%
    2. Powdered sugar 45-50%
    3. glucose 15-17%
    4. starch syrup 10-13%
    5. plasticizer 0.1%
    6. flavor 0.8-1.2%
        The components described above were kneaded by a kneader according to the foregoing formulation to provide a chewing gum. Encapsulated Flavor or sensate is then added and blended till homogeneous.
ii. Breath Fresheners
iii. Orally Dissolvable Strips
iv. Chewable Candy
v. Hard Candy
t) Baked products, preferably selected from the group consisting of bread, dry biscuits, cakes and other cookies;
u) snack foods, preferably selected from the group consisting of baked or fried potato chips or potato dough products, bread dough products and corn or peanut-based extrudates;
i. Potato, tortilla, vegetable or multigrain chips
ii. Popcorn
iii. Pretzels
iv. Extruded stacks
v) Cereal Products preferably selected from the group consisting of breakfast cereals, muesli bars and precooked finished rice products
w) Alcoholic and non-alcoholic beverages, preferably selected from the group consisting of coffee, tea, wine, beverages containing wine, beer, beverages containing beer, liqueurs, schnapps, brandies, sodas containing fruit, isotonic beverages, soft drinks, nectars, fruit and vegetable juices and fruit or vegetable preparations; instant beverages, preferably selected from the group consisting of instant cocoa beverages, instant tea beverages and instant coffee beverages
  i. Ready to drink liquid drinks
  ii. Liquid Drink Concentrates
  iii. Powder Drinks
  iv. Coffee: Instant Cappucino
    1. Sugar 30-40%
    2. Milk Powder 24-35%
    3. Soluble Coffee 20-25%
    4. Lactose 1-15%
    5. Food Grade Emulsifier 1-3%
    6. Encapsulated Volatile Flavor 0.01-0.5%
  v. Tea
  vi. Alcoholic
x) Spice blends and consumer prepared foods
  i. Powder gravy, sauce mixes
  ii. Condiments
  iii. Fermented Products
y) Ready to heat foods: ready meals and soups, preferably selected from the group consisting of powdered soups, instant soups, precooked soups
  i. Soups
  ii. Sauces
  iii. Stews
  iv. Frozen entrees
z) Dairy Products milk products, preferably selected from the group consisting of milk beverages, ice milk, yogurt, kefir, cream cheese, soft cheese, hard cheese, powdered milk, whey, butter, buttermilk and partially or fully hydrolyzed milk protein-containing products Flavored milk beverages
  i. Yoghurt
  ii. Ice cream
  iii. Bean Curd
  iv. Cheese
aa) Soya protein or other soybean fractions, preferably selected from the group consisting of soya milk and products produced therefrom, soya lecithin-containing preparations, fermented products such as tofu or tempeh or products produced therefrom and soy sauces;
bb) Meat products, preferably selected from the group consisting of ham, fresh or raw sausage preparations, and seasoned or marinated fresh or salt meat products
cc) Eggs or egg products, preferably selected from the group consisting of dried egg, egg white and egg yolk
dd) Oil-based products or emulsions thereof, preferably selected from the group consisting of mayonnaise, remoulade, dressings and seasoning preparations
ee) fruit preparations, preferably selected from the group consisting of jams, sorbets, fruit sauces and fruit fillings; vegetable preparations, preferably selected from the group consisting of ketchup, sauces, dried vegetables, deep-frozen vegetables, precooked vegetables, vegetables in vinegar and preserved vegetables
ff) Flavored pet foods.

All parts, percentages and proportions refer to herein and in the claims are by weight unless otherwise indicated.

The values and dimensions disclosed herein are not to be understood as being strictly limited to the exact numerical values recited. Instead, unless otherwise specified, each such value is intended to mean both the recited value and a functionally equivalent range surrounding that value. For example, a value disclosed as "50%" is intended to mean "about 50%."

The terms "capsule" and "microcapsule" herein are used interchangeably.

The invention is described in greater detail by the following non-limiting examples. Without further elaboration, it is believed that one skilled in the art can, based on the description herein, utilize the present invention to its fullest extent. All publications cited herein are incorporated by reference in their entirety.

EXAMPLE 1

A scent booster composition of this invention, i.e., Scent Booster 1, was prepared following the procedures below.
Preparation of a Microcapsule
A microcapsule used in Scent Booster 1, i.e., Microcapsule 1 (a melamine-formaldehyde microcapsule), was first prepared following the procedure described in US20070138674.
Preparation of a Pastille Formulation
A pastille formulation used in Scent Booster 1, i.e., Pastille 1, was prepared following the procedure below.
To a glass beaker was added 70 g of PEG 6000 (molecular weight 6000 g/mol, commercially available from Sigma-Aldrich, St. Louis, Mo.) and 10.86 g of clay (Bentolite H, commercially available from BYK Additives Inc., Gonzales, Tex.). After being mixed thoroughly, the resultant mixture was heated to 60 to 75° C. and stirred until a homogenous liquid was obtained, to which was added 2 g of fumed silica (Aerosil 200, commercially available from Evonik Industries, Parsippany, N.J.). Under agitation, 17.14 g of Microcapsule 1 prepared above was added to obtain a fragranced precursor. While still hot, the precursor was pipetted on to a clean, flat stainless steel surface using a 1 mL plastic syringe and allowed to cool to room temperature to obtain 100 g of Pastille 1.
Preparation of Scent Booster 1
To a glass beaker were added 32.59 g of sodium chloride, 0.28 g of a model fragrance, 0.2 g of fumed silica (Aerosil 200, Evonik Industries), 1.6 g of sodium silicate (commercially available from PQ Corporation, Valley Forge, Pa.), and 5.33 g of Pastille 1. The resultant mixture was mixed thoroughly to obtain 40 g of Scent Booster 1.

EXAMPLE 2

Another scent booster of this invention, i.e., Scent Booster 2, was prepare, which contained a free fragrance in a pastille formulation formed of PEG and clay.
More specifically, Scent Booster 2 was prepared by adding 70 g of PEG 6000 (Sigma-Aldrich) and 26.5 g of clay (Bentolite H, BYK Additives Inc.) to a glass beaker. After being mixed thoroughly, the resultant mixture was heated to 60 to 75° C. and stirred until a homogenous liquid was obtained, to which was added 2 g of fumed silica (Aerosil 200, Evonik Industries). Under agitation, 1.5 g of the model fragrance used in Example 1 was added. While still hot, the precursor was pipetted on to a clean, flat stainless steel surface using a 1 mL plastic syringe and allowed to cool to room temperature to obtain 100 g of Scent Booster 2.
This composition had the same ingredients as Scent Booster 1 except that no sodium chloride and microcapsules were used. The model fragrance contained aldehydes and terpenes. The composition decreases the oxidation of these aldehydes and terpenes and also slows down the evaporation of the volatile ingredients in the fragrance.

EXAMPLE 3

A third booster scent composition of this invention, i.e., Scent Booster 3, was prepared by adding 70 g of PEG 6000

(Sigma-Aldrich) and 25.01 g of clay (Bentolite H, BYK Additives Inc.) to a glass beaker. After being mixed thoroughly, the resultant mixture was heated to 60 to 75° C. and stirred until a homogenous liquid was obtained, to which was added 2 g of fumed silica (Aerosil 200, Evonik Industries). Under agitation, 0.7 g of the model fragrance and 2.29 g of Microcapsule 1 were added. While still hot, the precursor was pipetted on to a clean, flat stainless steel surface using a 1 mL plastic syringe and allowed to cool to room temperature to obtain 100 g of Scent Booster 3. This composition had the same ingredients as Scent Booster 1 except that no sodium chloride was used.

Comparative 1a

Comparative 1a was prepared by mixing 96.51 g of sodium chloride with 0.42 g of the model fragrance, 0.2 g of fumed silica, 1.5 g of sodium silicate, and 1.37 g of Microcapsule 1. This comparative composition had the same ingredients as Scent Booster 1 except that Microcapsule 1 was used instead of Pastille 1.

Free oil analysis showed that the microcapsules were broken when they were in contact with sodium chloride.

Comparative 1b

Comparative 1b was prepared by mixing 94 g of sodium chloride with 1.5 g of the model fragrance, 0.5 g of fumed silica, and 4 g of sodium silicate.

EXAMPLE 4

A fourth scent booster composition of this invention, i.e., Scent Booster 4, was prepared following the procedures below.

Preparation of a Microcapsule

A microcapsule used in Scent Booster 4, i.e., Microcapsule 2, was first prepared. This microcapsule had a hybrid silica-polyurea capsule wall. Tetraethyl orthosilicate was used as the sol-gel precursor. Lupranate M20 was used as the polyurea precursor. The weight ratio between tetraethyl orthosilicate and Lupranate M20 was 1:1.6.

In a beaker, 192 g of the model fragrance was mixed with 48 g of NEOBEE oil (commercially available Stepan, Chicago, Ill.), 12 g of tetraethyl orthosilicate (commercially available from Evonik, Essen, Germany), and 19.2 g of Lupranate M20 (a polymeric methylene diphenyl diisocyante-based resin containing multiple isocyanate groups, commercially available from BASF, Wyandotte, Mich.), to form an oil phase. In a separate beaker, an aqueous solution of 319.2 g of 0.9% Mowiol 4-98 (a fully hydrolyzed polyvinyl alcohol, commercially available from Kurary America Inc., Houston, Tex.) and 0.9% Walocel CRT 50000 PA (sodium carboxymethylcellulose; a co-dispesant commercially available from Dow, Midland, Mich.) was prepared and then emulsified with the oil phase to form the fragrance emulsion under high shearing (IKA-ULTRA TURRAX, T25 Basic) at 9500 rpm for three minutes. After the fragrance emulsion was heated to 35° C., 4.3 g of hexamethylene diamine ("HMDA," 40% in water, commercially available from Sigma-Aldrich, St. Louis, Mo.) and 5.2 g of water was added under constant mixing with an overhead mixer. After 15 minutes of stirring at 35° C., the capsule slurry was cured at 55° C. for two hours and then cooled to room temperature to obtain Microcapsule 2.

Preparation of a Pastille Formulation

A pastille formulation, i.e., Pastille 4, was prepared following the procedure below.

To a glass beaker was added 70 g of PEG 6000 (Sigma-Aldrich) and 10.86 g of clay (Bentolite H, BYK Additives Inc.). After being mixed thoroughly, the resultant mixture was heated to 60 to 75° C. and stirred until a homogenous liquid was obtained, to which was added 2 g of fumed silica (Aerosil 200, Evonik Industries). Under agitation, 17.14 g of Microcapsule 2 prepared above was added to obtain a fragranced precursor. While still hot, the precursor was pipetted on to a clean, flat stainless steel surface using a 1 mL plastic syringe and allowed to cool to room temperature to obtain 100 g of Pastille 4.

Preparation of Scent Booster 4

To a glass beaker was added 35.09 g of sodium chloride, 0.44 g of the model fragrance, 0.2 g of fumed silica (Evonik Industries), 1.6 g of sodium silicate (PQ Corporation), and 2.67 g of Pastille 4. The resultant mixture was mixed thoroughly to obtain Scent Booster 4.

EXAMPLE 5

A fifth scent booster composition of this invention, i.e., Scent Booster 5, was prepared following the procedures below.

Preparation of a Microcapsule

A microcapsule used in Scent Booster 5, i.e., Microcapsule 3, was first prepared following the procedure described below. Tetraethyl orthosilicate and Lupranate M20 were used at a weight ratio of 1:1 to prepare the microcapsule.

More specifically, 188.5 g of fragrance Greenfields was mixed in a beaker with 51.5 g of NEOBEE oil, 12 g of tetraethyl orthosilicate, and 11.5 g of Lupranate M20, to form an oil phase. In a separate beaker, an aqueous solution of 319.2 g of 0.9% Mowiol 4-98 (a fully hydrolyzed polyvinyl alcohol, commercially available from Kurary America Inc., Houston, Tex.) and 0.9% Walocel CRT 50000 PA (sodium carboxymethylcellulose; a co-dispesant commercially available from Dow, Midland, Mich.) was prepared and then emulsified with the oil phase to form the fragrance emulsion under high shearing (IKA-ULTRA TURRAX, T25 Basic) at 9500 rpm for three minutes. After the fragrance emulsion was heated to 35° C., 4.3 g of hexamethylene diamine (40% in water, commercially available from Sigma-Aldrich, St. Louis, Mo.) and 17.3 g of water was added under constant mixing with an overhead mixer. After 15 minutes of stirring at 35° C., the capsule slurry was cured at 55° C. for two hours and then cooled to room temperature to obtain Microcapsule 3.

Preparation of a Pastille Formulation

A pastille formulation, i.e., Pastille 5, was prepared following the same procedure as described in Example 4 above except that Microcapsule 3 was used instead of Microcapsule 2.

Preparation of Scent Booster 5

Scent Booster 5, was prepared following the same procedure as described in Example 4 above except that Microcapsule 3 was used instead of Microcapsule 2.

Performance Evaluation

Evaluation at Point of Purchase

Scent Booster 1 and Comparatives 1c and 1d were evaluated for fragrance intensity at the point of purchase ("POP").

Each of the compositions (20 g) was separately stored in a jar of the same size. The fragrance intensity was evaluated by a panel of 16 trained judges, being rated on a scale ranging from 0 to 100 according to the Labeled Magnitude Scale (LMS). A numerical value of 5 indicated a weak fragrance intensity, while of a value of 30 indicated a strong fragrance intensity.

At POP, Scent Boosters 1, 2, and 3 had a fragrance intensity of 16.45, 13.32, and 13.17, respectively.

Evaluation in an Automatic Laundry Application

Scent Booster 1 and Comparative 1b were evaluated in laundry washed by an automatic washing machine.

Each of the compositions (40 g) was applied to a standard US washing machine protocol with towels as described in U.S. Pat. No. 8,299,011. The towels were pre-washed with 45 g of detergent Tide Free (a detergent containing no fragrance). The towels were removed from the washing machine and dried in a heat dry machine. The fragrance intensity was evaluated by a panel of 16 trained judges after rubbing each towel with hands 5 to 6 times before evaluation for post-rub fragrance intensity. The intensity was rated on a scale ranging from 0 to 100 according the Labeled Magnitude Scale (LMS). A numerical value of 5 indicated a weak fragrance intensity, while of a value of 30 indicated a strong fragrance intensity.

Scent Booster 1 had a post-rub fragrance intensity of 12.41. As a comparison, Comparative 1b had a fragrance intensity of 4.36.

In addition, Scent Boosters 4 and 5 were evaluated together with Comparative 1b using a standard US washing machine protocol with towels as described in U.S. Pat. No. 8,299,011 in the presence of Tide Free.

The towels were dried by heat. The fragrance intensities were evaluated at pre- and post-rubbing. The fragrance intensity was rated on a scale ranging from 0 to 5. A numerical value of 5 indicated the towel producing a very strong intensity.

Scent Booster 4 had a fragrance intensity of 2.4 at pre-rub and 3.36 at post-rub. Scent Booster 5 had a fragrance intensity of 2.63 at pre-rub and 3.11 at post-rub. By comparison, Comparative 1b had a fragrance intensity of 2.07 at pre-rub and 1.57 at post-rub.

OTHER EMBODIMENTS

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

Indeed, to achieve the purpose of preparing a scent booster composition with a long-lasting, high performance, one skilled in the art can choose different fragrances, microcapsules, clays, fillers, and salt systems, varying the concentrations of these materials to achieve desirable organoleptic or release profiles in a consumer product. Further, the ratios among the salt system, free fragrances, pastille formulation, PEG, microcapsules, clays, and fillers can also be determined by a skilled artisan without undue experimentation.

From the above description, a skilled artisan can easily ascertain the essential characteristics of the present invention, and without departing from the spirit and scope thereof, can make various changes and modifications of the invention to adapt it to various usages and conditions. Thus, other embodiments are also within the claims.

What is claimed is:

1. A scent booster composition comprising
(a) a pastille formulation containing by weight of the formulation (i) 1% to 30% a fragrance microcapsule that has a microcapsule core and a microcapsule wall encapsulating the microcapsule core, in which the microcapsule core contains a fragrance, (ii) 1% to 30% a free fragrance, (iii) 2% to 20% a clay, and (iv) 50% to 70% polyethylene glycol that has a molecular weight of 2,000 to 10,000; and
(b) a fragranced sodium chloride system containing by weight of the system (i) 1% to 30% a free fragrance and (ii) 70% to 99% sodium chloride, wherein the weight ratio of the sodium chloride system and the pastille formulation is 50:50 to 90:10.

2. The scent booster composition of claim 1, wherein the pastille formulation contains: (i) 2% to 15% a fragrance microcapsule, (ii) 3% to 20% a free fragrance, (iii) 2% to 20% a clay, and (iv) 50% to 70% polyethylene glycol.

3. The scent booster of claim 2, wherein the pastille formulation contains by weight of the formulation (i) 2% to 15% a fragrance microcapsule, (ii) 3% to 20% a free fragrance, (iii) 5% to 20% a clay, and (iv) 50% to 70% polyethylene glycol.

4. The scent booster composition of claim 2, wherein the fragranced sodium chloride system contains by weight of the system (i) 2% to 10% a free fragrance and (ii) 90% to 98% sodium chloride.

5. The scent booster composition of claim 4, wherein the fragranced sodium chloride system further contains (i) 0.1% to 5% fumed silica by weight of the system, (ii) 0.1% to 5% sodium silicate, or (iii) any mixture thereof.

6. The scent booster composition of claim 2, wherein the pastille formulation further contains 0.1% to 40% a filler.

7. The scent booster composition of claim 6, wherein the filler is silica, sodium carbonate, sodium bicarbonate, soluble starch, pre-gelatinized starch, magnesium aluminum silicate, bentonite, microcrystalline cellulose, sodium carboxy methylcellulose, polyvinylpyrrolidone, guar gum, isapgul, sodium starch glycolate, aerosol, natural spon citrus pulp, alginic acid, alginates, ion exchange resin, modified corn starch, sodium dodecyl sulphate, sodium starch glycollateor, or a combination thereof.

8. The scent booster of claim 2, wherein the pastille formulation contains by weight of the formulation 5% to 20% a clay.

9. The scent booster composition of claim 2, wherein the polyethylene glycol has a molecule weight of 3,000 to 9,000.

10. The scent booster composition of claim 2, wherein the microcapsule wall is formed of a urea-formaldehyde polymer, a melamine-formaldehyde polymer, a phenolic-formaldehyde polymer, a urea-glutaraldehyde polymer, a melamine-glutaraldehyde polymer, a phenolic-glutaraldehyde polymer, polyurea, polyurethane, polyacrylate, polyamide, polyester, an epoxy cross-linked polymer, a polyfunctional carbodiimide cross-linked polymer, silica, a silica-derived material, or a combination thereof.

11. The scent booster composition of claim 10, wherein the scent booster composition consists of the pastille formulation and the fragranced sodium chloride system, the pastille composition contains 5% to 20% a clay, and the fragranced sodium chloride system contains 2% to 10% a free fragrance and 90% to 98% sodium chloride.

12. The scent booster composition of claim 1, wherein the fragranced sodium chloride system contains by weight of the system (i) 2% to 10% a free fragrance and (ii) 90% to 98% sodium chloride.

13. The scent booster composition of claim 1, wherein the fragranced sodium chloride system further contains 0.1% to 5% fumed silica by weight of the system.

14. The scent booster composition of claim 1, wherein the fragranced sodium chloride system further contains 0.1% to 5% sodium silicate.

15. The scent booster composition of claim 1, wherein the pastille formulation further contains 0.1% to 40% a filler.

16. The scent booster composition of claim 15, wherein the filler is silica, sodium carbonate, sodium bicarbonate, soluble starch, pre-gelatinized starch, magnesium aluminum silicate, bentonite, microcrystalline cellulose, sodium carboxy methylcellulose, polyvinylpyrrolidone, guar gum, isapgul, sodium starch glycolate, aerosol, natural spon citrus pulp, alginic acid, alginates, ion exchange resin, modified corn starch, sodium dodecyl sulphate, sodium starch glycollateor, or a combination thereof.

17. The scent booster composition of claim 1, wherein the polyethylene glycol has a molecule weight of 3,000 to 9,000.

18. The scent booster composition of claim 1, wherein the microcapsule wall is formed of a urea-formaldehyde polymer, a melamine-formaldehyde polymer, a phenolic-formaldehyde polymer, a urea-glutaraldehyde polymer, a melamine-glutaraldehyde polymer, a phenolic-glutaraldehyde polymer, polyurea, polyurethane, polyacrylate, polyamide, polyester, an epoxy cross-linked polymer, a polyfunctional carbodiimide cross-linked polymer, silica, a silica-derived material, or a combination thereof.

19. A method of treating laundry comprising adding the scent booster composition of claim 1 to laundry washing machine or wash basin.

\* \* \* \* \*